UNITED STATES PATENT OFFICE.

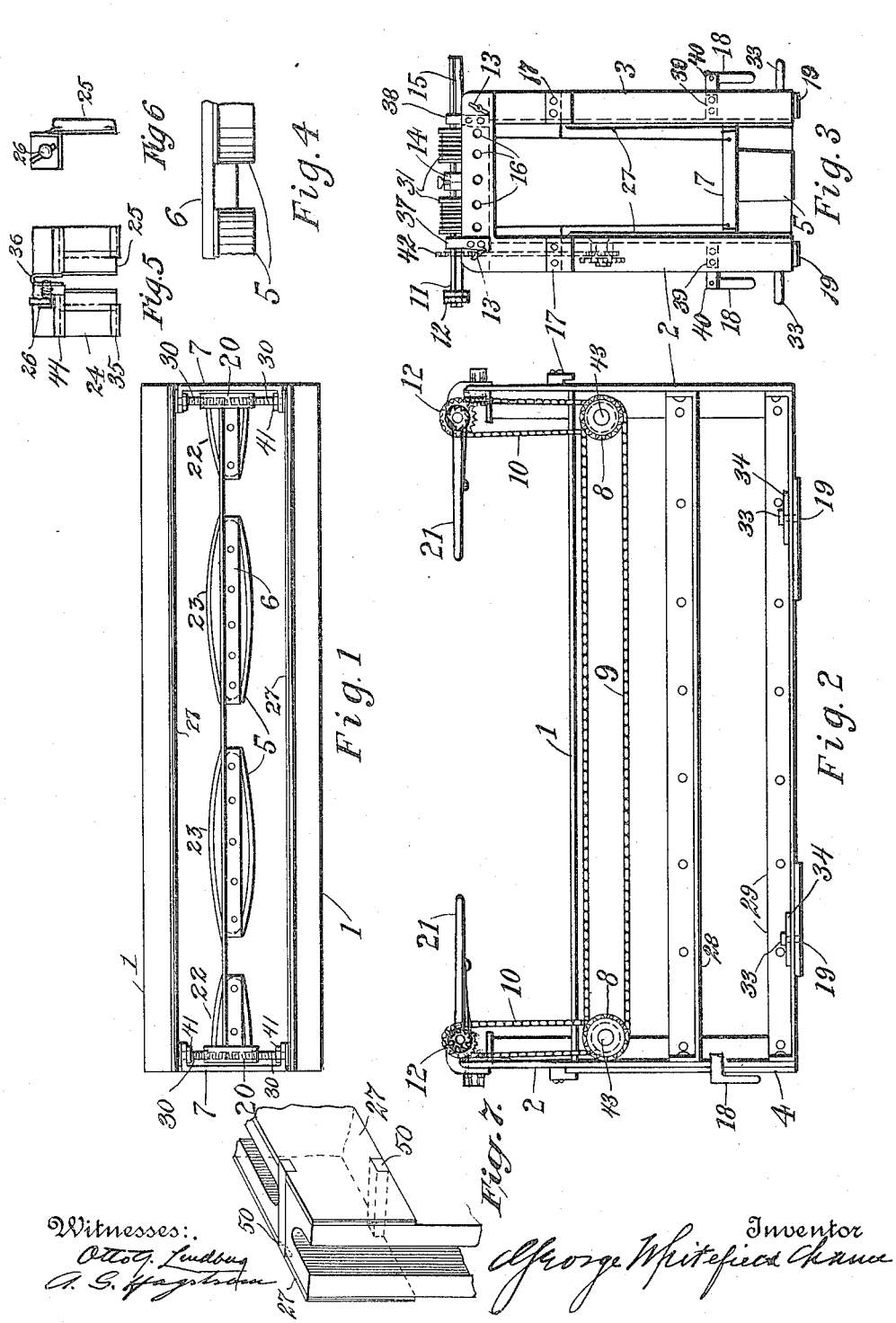

GEORGE WHITEFIELD CHANCE, OF BRISTOL, PENNSYLVANIA.

MOLDING-MACHINE FOR MOLDING PLASTIC MATERIALS.

1,196,521. Specification of Letters Patent. Patented Aug. 29, 1916.

Application filed November 30, 1912. Serial No. 734,382.

*To all whom it may concern:*

Be it known that I, GEORGE WHITEFIELD CHANCE, a citizen of the United States, residing at Bristol, in the county of Bucks and State of Pennsylvania, have invented certain new and useful Improvements in Molding-Machines for Molding Plastic Materials, of which the following is a specification.

My invention consists in an improved type of molding machine.

The purpose of my machine is for use in constructing hollow walls and cellular constructions of hardening plastic material, especially in place on the permanent location of such constructions, although the machine may be used to make building blocks.

The machine is constructed with two sides, approximately parallel, the sides being stiffened to prevent bulging and they are connected together at each end at top by overlapping L-shaped arms which are designed to tie the sides together and are made so that they are adjustable to different widths of the wall or structure being built, the arms having holes in the upper horizontal part of the same, the holes in each arm matching ones in the other arm, connected to each side respectively. Pins with wing nuts on one end and a revolving lug, in the other end, are used to securely clamp the arms together, the lug revolving on a bearing near the end of the pins and catching on the arm, so that the wing nuts being turned on the pins, draw the arms together.

There is between the sides of the machine, a part of the machine designed to make hollow or cellular openings through the construction, this part of the machine I designate as the core, although it is composed of duplicate parts, as to the coring out apparatus, each of which I term core units and each of which makes a hollow space in the construction used to build a wall or such construction; the end parts of the core are half core units. The core units are tapering in form, so that they may be readily withdrawn from the construction and are attached to an angle and the whole core structure is raised by hoisting drums, located at each end of the machine, which drums carry means to raise up the core and elevate it between the sides and raise it clear of the construction.

The drums are centered on a shaft at each end of the machine, on which shaft is a ratchet wheel and working into the ratchet teeth of the wheel is a spring ratchet. The pawl of the ratchet is pressed by the spring into the teeth of the ratchet and the handle works on an independent bearing on the shaft, independent from the ratchet wheel, so that on one stroke of the handle the ratchet does not engage the teeth of the ratchet wheel, while on the opposite stroke it does engage the teeth. The ratchet wheel is keyed to the shaft and thus by an up and down action of the handle, the shafts with the drums are rotated.

There is a sprocket wheel on each shaft and also on one side of the machine under each shaft and there is a chain drive connecting the sprocket wheels so that they all act together; that is, the working of the handle at either end of the machine actuates the mechanism just described, turning the drums and winding up the ropes or chains on the drums, thus elevating the core, which is attached to the raising mechanism.

Among the particular advantages I claim for the machine is an apparatus with a small number of parts and light in weight, readily supported on a wall or other work under construction, by projecting movable arms attached to the lower part of the sides, arranged to work on pins so that they may be moved into a position at right angles to the plane of the sides, or on pieces of metal or other material laid across the wall, such machine being adapted to make hollow walls in place and on account of its core arrangement, allowing the filling in of plastic material around the core parts and the withdrawing of core parts in stages, that is, not in one operation, thus making it less liable to produce an imperfect construction, due to the adhesion of the core to the construction, which is likely to lift and perhaps break the construction. The spaces between the core parts are so designed that material of a different composition than that in the main body of the construction may be used between the core units.

There are thin plates which fit inside of the mold, which are designed to hold the construction together while the mold is being removed and afterward are necessary to enable the mold to be readily removed without breaking it, these plates are about the size of the mold sides and are tied together by metal pieces which preferably are U-shaped and are placed at the top and bottom of each set of plates, the sheets being held together by these clips; the lower clips are placed on the wall and are removable, after the construction is made, while the upper ones as well as the lower ones, tie the plates together until the construction is sufficiently strong to allow their removal.

The sides of the machine are readily separated from each other by removing the connecting pins which connect the L-shaped angles at the ends of the machine and by uncoupling the shafts at each end, which shafts are made in two parts coupled near the center by a socket coupling with a thumb screw in the female end of the coupling.

The main object in having the machine readily detachable is so that it may be quickly separated and reassembled again, which is of particular advantage where vertical reinforcing rods are used in the wall, as this is necessary to pass the machine longitudinally along the wall to avoid interference with such rods with the parts connecting the sides of the machine. There is also a stop which is set over the upright flange of the angle which connects the core units and is clamped thereon when it is intended to mold less than the full length of the mold; this stop has a clamp screw to clamp the upright leg of said angle and the stop is provided with adjustable slides so that it can be widened to fill the entire space between the core parts and the sides of the mold.

In the drawing, Figure 1 shows a plan view of the mold, Fig. 2 a side elevation of the mold and Fig. 3 an end view of the mold, while Fig. 4 shows an elevation detail of the connection between the core units. Fig. 5 shows an elevation of the stop to cut off the construction in the mold and Fig. 6 a side view of the same. Fig. 7 is a perspective view of a portion of the structure showing inside side plates thereon.

1, shows the side or sides of the mold, bent over at the top and stiffened by the angles 28, 29.

2, shows an angle bent over and drilled, attached to side 1. 3, shows a similar angle attached to the other side 1; the angles 2 and 3 slide past each other where drilled and are held together by the pins 13, 13, which have wing nuts and on the far side a latch, so that they may be tightened against the angles, clamping them together.

4, shows an end plate which may be duplicated and used on each end of the machine; it has attached to it clamps 18, 18, which clamps are pivoted on the pins 40, 40, revolving in lugs 39, 39, which are fastened to plate or plates 4, the clamps having projecting lugs which engage the angles 2 and 3 and clamp the plate 4 against the angles; the upper edge of the plate or plates is caught under groove lugs 17, 17, thus holding the plate in place.

5, shows the core and 23, 23, shows two full core units, oblong in plan and hollow at bottom and closed at top and connected to an angle, 6. 22, 22 shows similar half core units, closed on tops and ends; the core units are all tapering from top to bottom on sides and ends, except ends next to ends of machine.

7, 7 show flat pieces bent at the ends and with holes in the same, through which projecting ends of screws 30, 30 from the turn buckles 20, 20 pass and serve as spacers or guides to center the core in the mold by the ends of the screws pressing against the sides of the mold; these screws have jam nuts 41, 41 near the ends to press against the parts of 7, 7; the turn buckles allowing adjustment of the guides for different widths of the mold, and are fastened to core parts 22, 22 and parts 7, 7.

8, 8 show sprocket drives revolving on pin or pins 43, attached to the sides of the mold, the sprocket drive is composed of a large and a small sprocket wheel.

9 and 10, 10 are sprocket chains, 10 working on the small sprocket of the sprocket drive 8, and on sprocket 42.

11, shows a shaft or shafts at each end of the machine which shaft is divided and has a socket coupling 14, to join the same and a keyway 15 therein on which the handles 21, 21 fit and on which ratchets 12, 12 are keyed so that they may turn shafts 11, 11 when actuated by levers 21, 21.

31, 31 show drums located on each shaft 11, 11 on which lifting ropes or mechanism 32, 32 are wound, being attached to the core by cross pieces 7, 7.

16, 16 show holes in the upper angles designed for the pins 13, 13 to pass, and for varying the spacing of the sides of the mold.

19, 19 are feet which have a pin through each and attached thereto and handles 33, 33 connected with pins running through lower angles 29, 29 and designed to move or rotate the pins so as to throw the feet at right angles to the construction for the purpose of supporting the mold thereon; 34, 34 being pieces attached to the flanges of the angles for stiffening the same and to act as bushings for the pins mentioned.

24, shows a stop-plate cut out and bent as shown, with grooves 44, 35, top and bottom in which the plates 25, 25 slide back and forth, thus narrowing or widening the width of the stop for the purpose of adjusting it to different widths in the mold, clamping it over the angle 6, by the saddle-like portion 36 and the clamp-screw 26, adjusting the saddle 36 over the vertical leg of the angle 6.

27, 27 show plates inside of the mold as used to tie the construction together and cause the structure to remain intact while the sides of the mold are being removed from the construction, these plates 27, 27 being held together top and bottom by U-shaped clips 50.

37 and 38 are bearings for the shaft 11 and are attached to the parts 2 and 3 respectively.

The process of operating the mold is as follows: The parts are assembled as shown in the drawing Figs. 1, 2 and 3, the mold is set on a foundation wall or part of the wall already built, the end plates are on and the pins 13, 13 tightened and plates 27, 27 being in place, the core being at the bottom of the mold. The mold is filled between the sides and the core to the height of the core, with plastic material and rammed, the handle or handles 21, 21 are worked up and down, thus raising the core its height, the operation is repeated until the mold is filled, or as much filled as desired, the core being clear of the construction; the mold is then moved along its length and set up against the construction already formed and the operation repeated, the half core, 22 at the end making a full core-opening, when set against a section molded. In starting a corner the half core opening at one end is rammed full of plastic material after the core is raised, thus making a solid end to the wall. The mold may be spread at the bottom by using but one pin, 13, in hole 16 at each end of the machine, near the center of each arm, and pulling the sides apart at the bottom of the mold. Drums 31, 31 are keyed on shaft 11 but can be shifted to accommodate a change in the distance between the sides of the mold.

What I claim is:—

1. In a mold, in combination, two sides, connecting means above the same, a core between the sides, turnbuckles attached to the core near the ends at right angles thereto and screws extending each side from the turnbuckles and pressing against the sides of the mold.

2. In a mold, in combination, two sides, a core located between the sides, a drum hoist near each end of mold attached to cross arms adjustably connecting the sides, a connecting flexible drive between the drums so arranged that the hoist may be operated from either end of the mold and lift the core by the action of both drums synchronously.

3. In a mold, in combination, two sides, a core between the sides, drum hoists mounted thereon near the ends of the sides, cables wound on said hoists and attached to the core, together with supporting feet attached to the lower part of the sides which feet may be thrown outside of the inner faces of the sides or project inside of the inner faces of the sides.

4. In a mold, in combination, two sides, a core between the sides composed of two or more tapering units, drum hoists attached to the sides at the ends of the mold and connected to the core by flexible connections, movable feet attached to the lower part of the sides, and removable end plates connecting the sides.

5. In a mold, in combination, two sides, inside plates adjoining the inner surfaces of the sides, a core between the sides, drum hoists connected to the sides and adapted to raise the core and supports under the sides of the mold.

6. In a mold, in combination, two sides about parallel, L-shaped extensions connecting the same, brackets attached to the extensions, a shaft at each end of the mold supported by the brackets, a drum on each shaft, flexible members on the drum and connected to the core, a ratchet attached to each shaft, a sprocket wheel on each shaft, a double sprocket wheel near each end of one side of the mold, pins fastened on the outside of said side near each end upon which pins the sprockets revolve, a chain extending from one shaft sprocket at one end of the machine to the shaft sprocket at the other end, and a removable end plate at each end of the mold.

7. In a mold, in combination, two sides, a core between the sides, adjustable end plates, a shaft at each end of the mold, a drum hoist on each shaft, a flexible connection between the drum and the core, a shaft carrying a handle and ratchet mechanism at each end of the mold, a stop plate for cutting off the construction in the mold, and means for supporting the mold on the construction.

In testimony whereof I affix my signature in presence of two witnesses.

GEORGE WHITEFIELD CHANCE.

Witnesses:
  Ross E. Weaver,
  Martha H. Quinn.